US011983506B2

(12) United States Patent
Baek et al.

(10) Patent No.: US 11,983,506 B2
(45) Date of Patent: May 14, 2024

(54) HYBRID TRANSLATION SYSTEM USING A GENERAL-PURPOSE NEURAL NETWORK MACHINE TRANSLATOR

(71) Applicant: TWIG FARM CO., LTD., Seoul (KR)

(72) Inventors: Sun Ho Baek, Seoul (KR); Chul Ho Baek, Seoul (KR)

(73) Assignee: TWIG FARM CO., LTD., Seoul (KR)

( * ) Notice: Subject to any disclaimer, the term of this patent is extended or adjusted under 35 U.S.C. 154(b) by 394 days.

(21) Appl. No.: 17/410,573

(22) Filed: Aug. 24, 2021

(65) Prior Publication Data

US 2022/0075964 A1 Mar. 10, 2022

(30) Foreign Application Priority Data

Sep. 9, 2020 (KR) .................. 10-2020-0115402

(51) Int. Cl.
*G06F 40/58* (2020.01)
*G06N 3/02* (2006.01)

(52) U.S. Cl.
CPC .............. *G06F 40/58* (2020.01); *G06N 3/02* (2013.01)

(58) Field of Classification Search
CPC ........... G06F 40/47; G06F 40/58; G06F 40/51
See application file for complete search history.

(56) References Cited

U.S. PATENT DOCUMENTS

| 9,817,821 | B2 * | 11/2017 | Rylov | G06F 40/58 |
| 10,839,164 | B1 * | 11/2020 | Shorter | G06N 3/043 |
| 2015/0127320 | A1 * | 5/2015 | Seo | G06F 40/58 |
| | | | | 704/2 |
| 2016/0162477 | A1 * | 6/2016 | Orsini | H04L 51/212 |
| | | | | 704/2 |
| 2017/0091179 | A1 * | 3/2017 | Kim | G06F 40/197 |
| 2018/0101522 | A1 * | 4/2018 | Fujiwara | G06F 40/51 |
| 2018/0143975 | A1 * | 5/2018 | Casal | G06F 40/51 |
| 2018/0322117 | A1 * | 11/2018 | Cohen | G10L 15/26 |
| 2019/0155909 | A1 * | 5/2019 | Na | G06F 40/44 |
| 2021/0141867 | A1 * | 5/2021 | Wason | G06V 10/82 |

FOREIGN PATENT DOCUMENTS

| KR | 20150116675 | 10/2015 |
| KR | 101620000 | 5/2016 |
| KR | 20160145140 | 12/2016 |
| KR | 102009901 | 8/2019 |
| KR | 102061217 | 12/2019 |

* cited by examiner

*Primary Examiner* — Mark Villena
(74) *Attorney, Agent, or Firm* — CANTOR COLBURN LLP (57) ABSTRACT

Provided is a method of performing hybrid translation using a general-purpose neural network machine translator by a device, including: (a) receiving an original document configured of a first language from a user terminal; (b) determining a field of the original document by comparing the original document with a standard document for each field stored in a database; (c) generating a primary translation configured of a second language for the original document by using the general-purpose neural network machine translator; and (d) converting some expressions included in the primary translation into expressions in another second language with reference to a professional translation dictionary for the determined field to generate a secondary translation, wherein the expression includes any one of a word, a phrase, and a sentence.

12 Claims, 6 Drawing Sheets

HYBRID TRANSLATION SYSTEM USING A GENERAL-PURPOSE NEURAL NETWORK MACHINE TRANSLATOR

BACKGROUND

1. Technical Field

The present disclosure relates to a hybrid translation system using a general-purpose neural network machine translator.

2. Related Art

In recent years, artificial intelligence technologies represented by deep learning are being studied a lot while recording innovative performance in various pattern recognition fields including voice recognition and image recognition.

In particular, machine translation is a representative natural language processing field where deep learning is successfully applied. In other words, neural networks-based machine translation (NMT) presents a paradigm different from machine translation based on several existing modules in that a translation model is constructed and trained with a single neural network.

Basically, in order to improve the performance of neural network machine translators, countless data must be provided. In this regard, a general-purpose neural network machine translator distributed by a company operating a global search engine provides learning data to countless users who use the search engine. Due to this, it illustrates performance based on a large amount of learning data and boasts better performance than other neural network translation engines. Therefore, it is very difficult for a novel neural network translation engine to catch up with the performance of such a general-purpose neural network machine translator.

However, such a general-purpose neural network machine translator is used for translation of a myriad of terms in various fields by general users or for translation of commonly used expressions such as conversation. Accordingly, the translation result is also generated as a translation including general terms, and it is difficult to provide a result with high expertise in a specific field.

In this regard, Korean Patent Laid-Open No. 10-2016-0145140 discloses a method and a system for providing translation information.

SUMMARY

The present disclosure is provided to solve the problems of the related art described above, and an object thereof is to provide a hybrid translation system using a general-purpose neural network machine translator which performs primary translation using a general-purpose neural network machine translator and performs secondary translation that converts some terms into professional terms in a field in which the document is used to provide translation suitable for the professional field of the document.

However, the technical problem to be solved by the present embodiment is not limited to the technical problem as described above, and other technical problems may exist.

As technical means for solving the technical problems, according to an example of the present disclosure, there is provided a method of performing hybrid translation using a general-purpose neural network machine translator, including: (a) a step of receiving an original document configured of a first language from a user terminal; (b) a step of determining a field of the original document by comparing the original document with a standard document for each field stored in a database; (c) a step of generating a primary translation configured of a second language for the original document by using the general-purpose neural network machine translator; and (d) a step of converting some expressions included in the primary translation into expressions in another second language with reference to a professional translation dictionary for the determined field to generate a secondary translation. The expression includes any one of a word, a phrase, and a sentence. The general-purpose neural network machine translator is a commercial neural network machine translator of another company that is open for use by general users online.

The step of determining the field of the original document includes a step of extracting each of the most used keywords from the standard document for each field stored in the database, extracting the most used keywords from the original document, and comparing respective keywords with each other to determine a similarity degree between the original document and the standard document for each field.

In the step of determining the similarity degree, a frequency at which respective keywords are used are identified in each standard document and the original document, keywords corresponding from the highest frequency to a predetermined lower rank are extracted, and a matching degree between keywords of each standard document and keywords in the original document is determined to determine the similarity between the original document and the standard document for each field.

In the step of determining the field of the original document, a field of the standard document having the highest score according to the result of determining the matching degree between the keywords of each standard document and the keywords of the original document is determined as the field of the original document.

The professional translation dictionary stores information on a plurality of term pairs for converting a specific term of the second language to fit another term used in the professional field, and a part of speech of the term is about at least one a noun and a verb.

In the step of generating the primary translation, a preset neural network machine translator among a plurality of general-purpose neural network machine translators that general users are configured to use through a preset API connection is executed, and the original document is input into the translation target text input area to generate the primary translation.

Before the step of generating the secondary translation, the method further including: a step of receiving a user dictionary built by a user from the user terminal; a step of requesting a dictionary selection to perform professional field translation for the primary translation with the user terminal; a step of receiving a selection for the user dictionary from the user terminal; and a step of generating the secondary translation based on the user dictionary.

In the step of determining the field of the original document, when keywords having a preset frequency extracted from the original document are all detected as keywords in standard documents of a plurality of fields different from each other, a plurality of fields of the original document are set, and the step of generating the secondary translation includes a step of generating the secondary translation with reference to the plurality of professional translation dictionaries.

In the step of generating the secondary translation, when any one keyword in the primary translation is detected in all the plurality of professional translation dictionaries, information on the frequency of using the keyword in the standard document of each field is compared and the translation of the keyword is performed by referring to the professional translation dictionary in a field of standard document which is used more frequently.

In the step of generating the secondary translation, after detecting a translation target term of the primary translation, a preference of the user is reflected, and a term in the professional translation dictionary suitable to match the translation target term is derived to generate the secondary translation.

In the step of generating the secondary translation, the translation word pair preferred by the user is identified by analyzing a relationship between the original document and the translation of the user document previously input by the user to reflect the preference of the user, and in a case of a new user who has no history of inputting the user document, the preference of other users who input documents in the same field is regarded as the preference of the new user.

Between the step of generating the primary translation and the step of generating the secondary translation, when a term which is not in the professional translation dictionary available by a device is detected among the terms of the primary translation, the method further including: a step of providing the detected term to the user terminal in advance and receiving a translation term for the detected term from the user terminal.

In the step of generating the secondary translation, except for the translation term received from the user terminal, after performing the translation using the professional translation dictionary for the rest, a translation result for the translation term received from the user terminal and a translation result by the professional translation dictionary combine to generate the secondary translation.

According to another example of the present disclosure, there is provided a hybrid translation device using a general-purpose neural network machine translator, including: a memory storing a program for a method of performing hybrid translation using a general-purpose neural network machine translator; and a processor executing the program. According to the execution of the program, the processor receives an original document configured of a first language from a user terminal; determines a field of the original document by comparing the original document with a standard document for each field stored in a database; generates a primary translation configured of a second language for the original document by using the general-purpose neural network machine translator; and converts some expressions included in the primary translation into expressions in another second language with reference to a professional translation dictionary for the determined field to generate a secondary translation. The expression includes any one of a word, a phrase, and a sentence. The general-purpose neural network machine translator is a commercial neural network machine translator of another company that is open for use by general users online.

According to the problem solving means of the present disclosure described above, by analyzing the contents of the document, determining the professional field, and performing the machine translation with the translator for each professional field, it is possible to provide a translation result with high professionalism to which the professional terms for each field are applied.

In addition, in a case of a field where it is difficult to secure document data for learning, the translator may operate based on commercially available machine translators such as Google Translator and terminology dictionaries by field. Based on this, it is possible to generate a translated document with higher accuracy than the general-purpose Google Translator.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Figure 1:
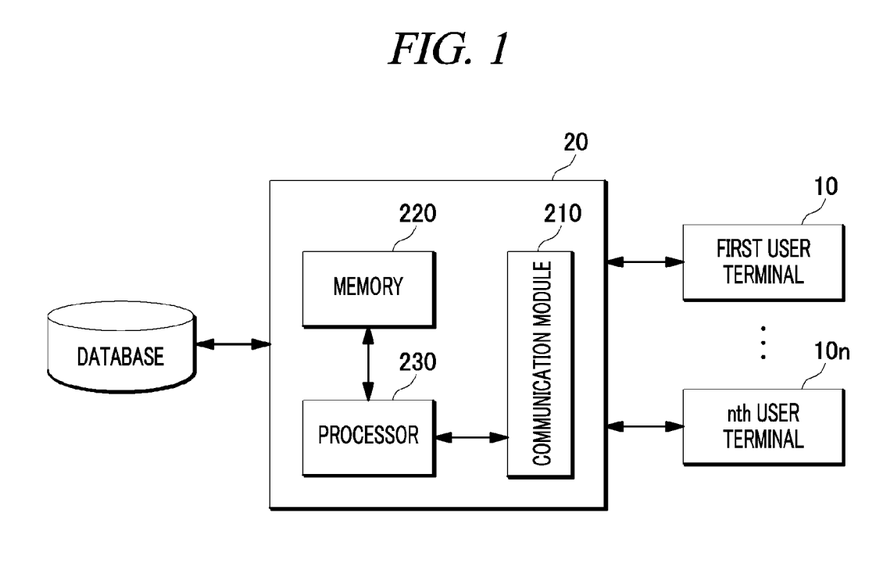
FIG. 1 is a block diagram of a hybrid translation system using a general-purpose neural network machine translator according to an embodiment of the present disclosure.

Illustratively, a user terminal 10 includes a communication module, a memory, and a processor, and the communication module of each terminal may perform data communication with a device 20 under the control of the processor, respectively.

As illustrated in FIG. 1, the device 20 includes a communication module 210, a memory 220, a processor 230, and a database.

The communication module 210 provides a communication interface necessary to provide a signal transmitted and received to and from the user terminal 10 in a form of packet data in conjunction with a communication network. Here, the communication module 210 may be a device including hardware and software necessary for transmitting and receiving a signal such as a control signal or a data signal through wired/wireless connection with other network devices.

The memory 220 stores a program related to a method of performing hybrid translation using the general-purpose neural network machine translator for providing a translation service to the user terminal 10. In addition, the memory 220 performs a function of temporarily or permanently storing data processed by the processor 230. Here, the memory 220 may include a volatile storage medium or a non-volatile storage medium, but the scope of the present disclosure is not limited thereto.

The memory 220 may store a separate program such as an operating system for processing and controlling the processor 230, and may perform a function of temporarily storing input or output data.

The memory 220 may include at least one type of storage medium of a flash memory type, a hard disk type, a multimedia card micro type, a card-type memory (for example, SD, XD memory, or the like), a RAM, and a ROM. Also, the user terminal 10 may operate a web storage that performs a storage function of the memory 220 on the Internet.

The processor 230 executes a program related to a method of performing hybrid translation using the general-purpose neural network machine translator, and provides a function of controlling hardware of a terminal according to the execution of the program. That is, the processor 230 may perform a hardware control function such as a file system, a memory allocation, a network, a basic library, a timer, a device control (display, media, input device, 3D, or the like), and other utilities required as the program is executed.

Here, the processor 230 may include all kinds of devices capable of processing data, such as a processor. Here, the 'processor' may refer to, for example, a data processing device embedded in hardware having a physically structured circuit to perform a function expressed as a code or an instruction included in a program. An example of the data processing device embedded in the hardware as described above includes a processing device such as a microprocessor, a central processing unit (CPU), a processor core, a multiprocessor, an application-specific integrated circuit (ASIC), or a field programmable gate array (FPGA), but the scope of the present disclosure is not limited thereto.

A schematic procedure for providing the translation service provided through a program related to the method of performing the hybrid translation using a general-purpose neural network machine translator according to an embodiment of the present disclosure is as follows.

The processor 230 receives the original document in the first language from the user terminal 10, compares the original document with the standard document for each field stored in the database, determines the field of the original document, and uses a general-purpose neural network machine translator to generate a primary translation configured of a second language for the original document, refers to a professional translation dictionary for the determined field, and converts some expressions included in the primary translation into expressions in another second language to generate a secondary translation.

Accordingly, the processor 230 may determine a professional field by analyzing the content of the document and perform machine translation with the determined professional field translator, thereby providing a highly professional translation result to which the professional term for each field is applied.

Figure 2:
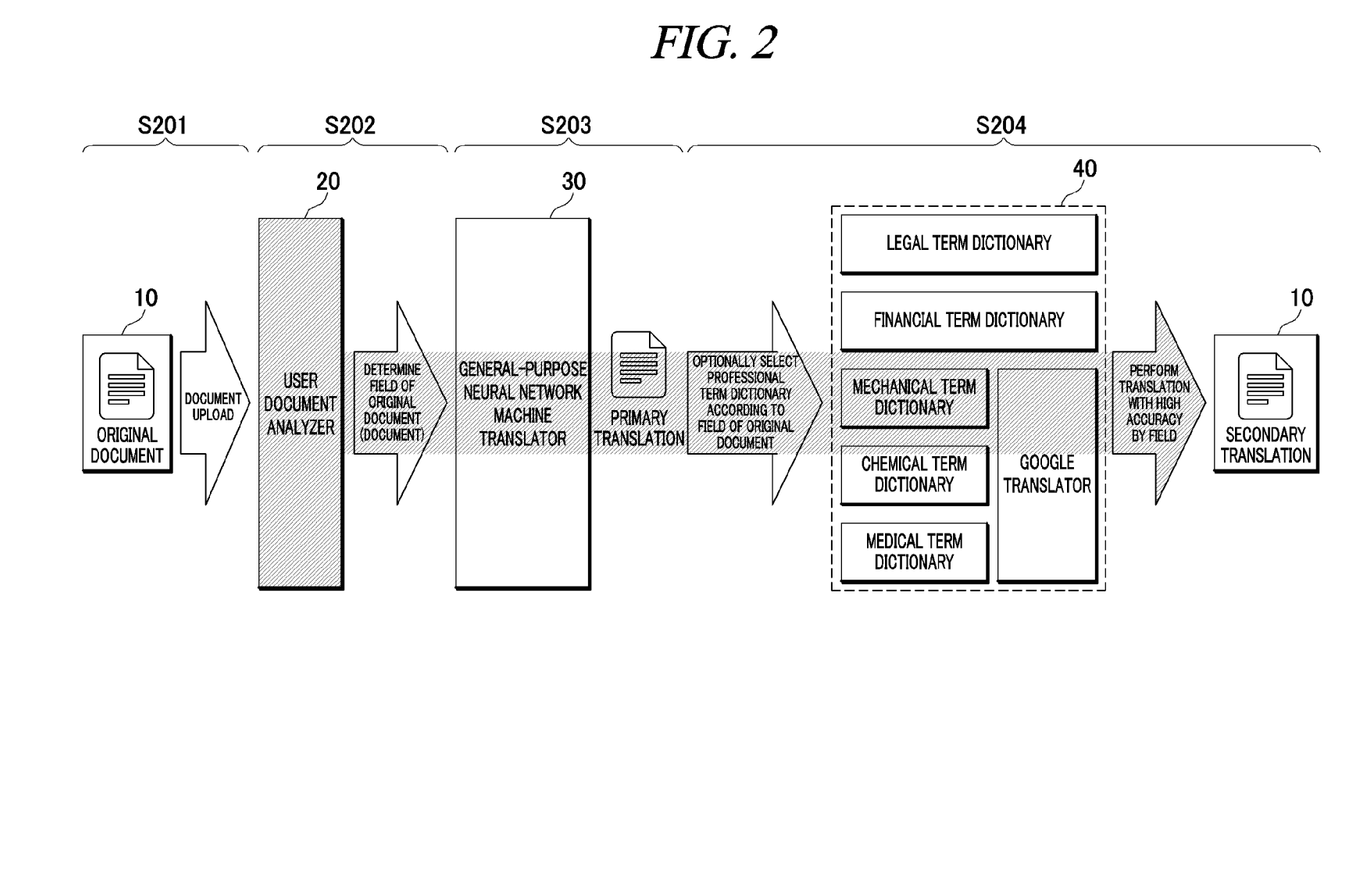
FIG. 2 is a diagram for explaining a translation process of the hybrid translation system using a general-purpose neural network machine translator according to an embodiment of the present disclosure.

FIG. 2 is a diagram for explaining a translation process of a hybrid translation device using the general-purpose neural network machine translator according to an embodiment of the present disclosure.

Referring to FIG. 2, the processor 230 may receive an original document configured of the first language from the user terminal 10 (S201) and compare the original document with a standard document for each field stored in the database to determine the field of the original document (S202).

In addition, the processor 230 may use the general-purpose neural network machine translator 30 to generate a primary translation configured of the second language for the original document (S203), and refer to a professional translation dictionary 40 for the determined field, and convert some expressions included in the primary translation into an expression of another second language to generate the secondary translation (S204). In this case, the expression includes any one of a word, a phrase, and a sentence, and the general-purpose neural network machine translator 30 means a commercial neural network machine translator of another company that is open for use by general users online.

As an example, the professional translation dictionary 40 refers to various dictionary databases, as an external dictionary database, operated by countries, institutions, associations, and the like. For example, the external dictionary database may be a dictionary database including information on a plurality of term pairs for converting a specific term for each field into another term used in a professional field. At this time, each field includes a legal dictionary, a financial dictionary, a mechanical dictionary, a chemical dictionary, a medical dictionary, a food dictionary, or the like. Meanwhile, the professional translation dictionary 40 may include a dictionary database provided by another electronic document management server or a dictionary database provided through a machine translation program. In addition, it may be an external ontology, thesaurus, word-net, or the like, but is not limited thereto. The professional translation dictionary 40 may be a dictionary database including term pairs for an original document and a translated document.

Figure 3:
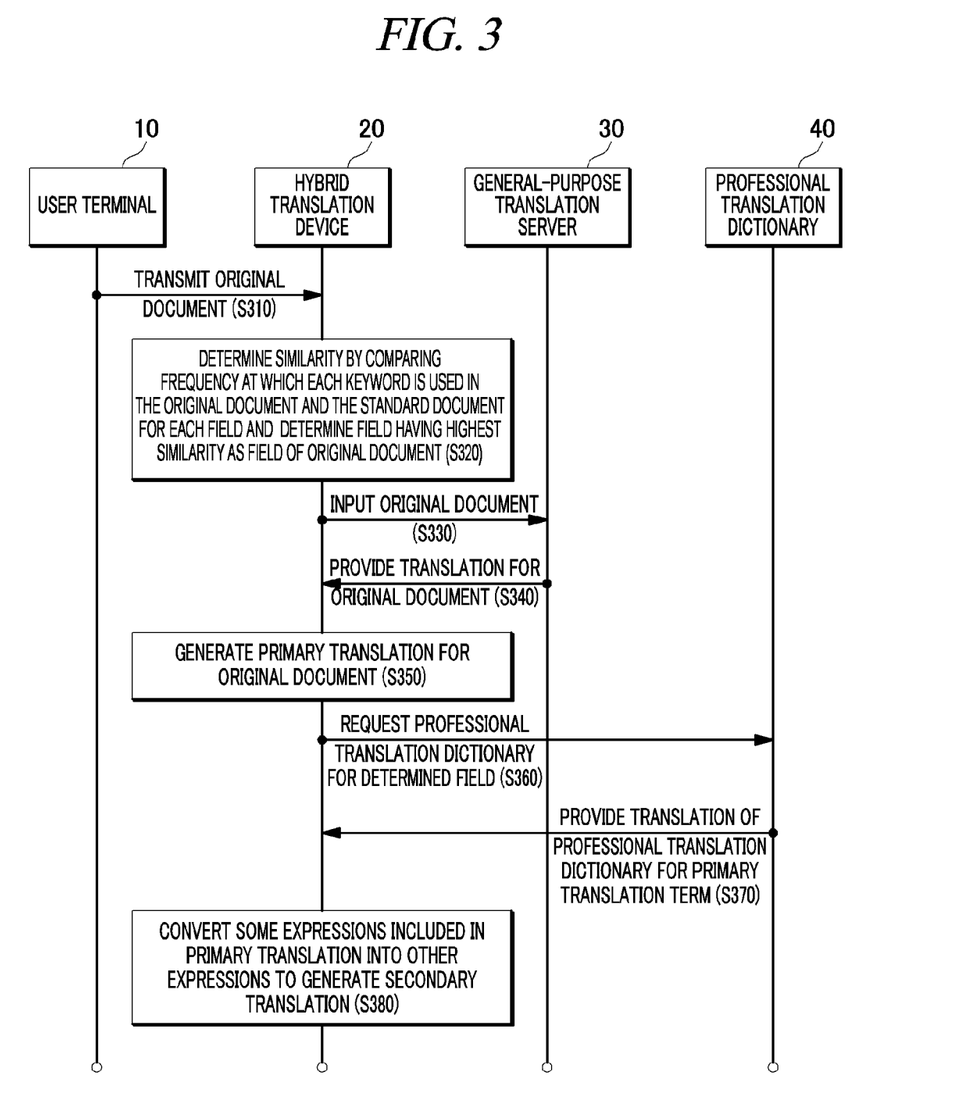
FIG. 3 is a data flowchart for explaining a hybrid translation method using a general-purpose neural network machine translator according to an embodiment of the present disclosure.
Figure 4:
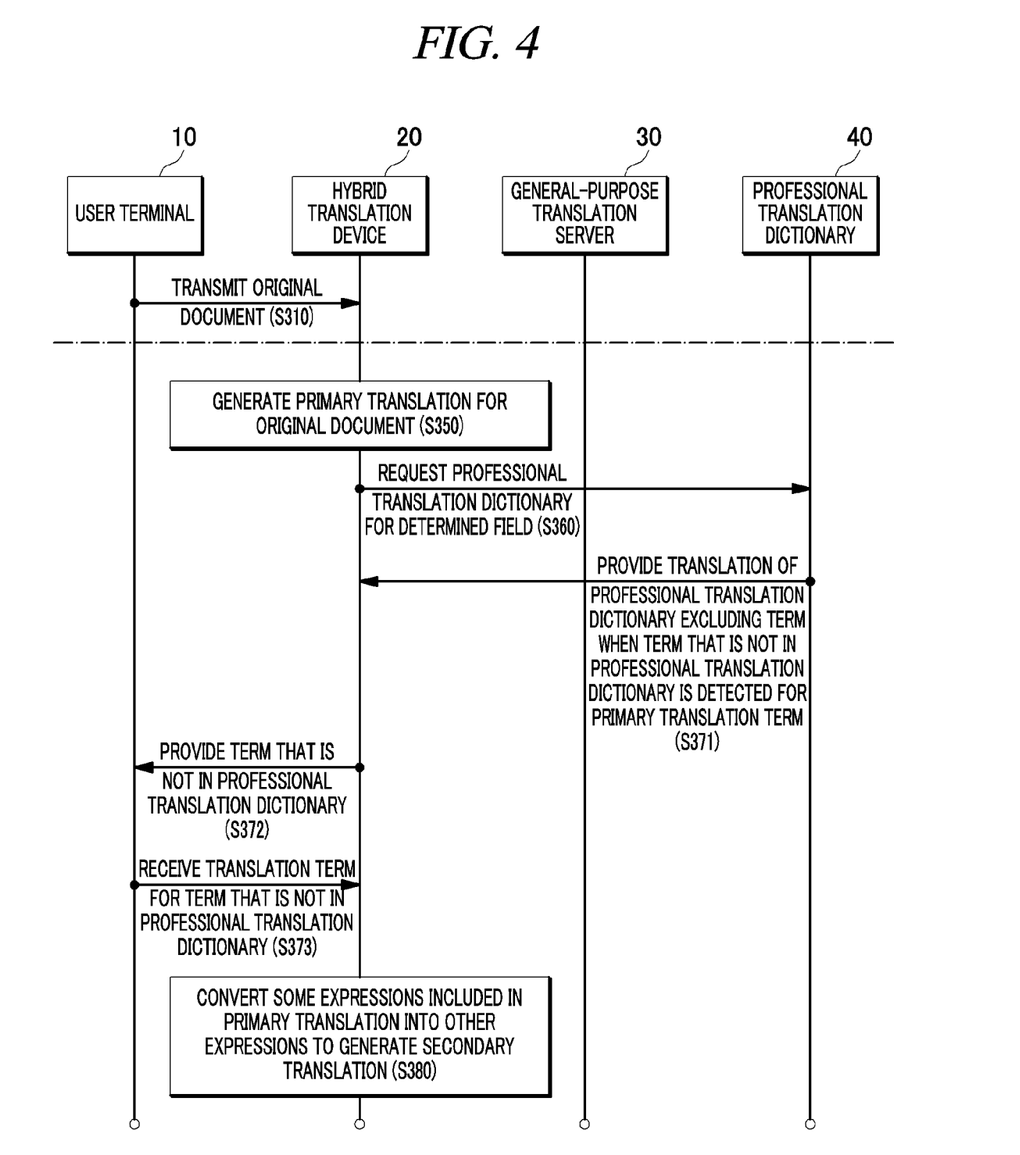
FIG. 4 is a diagram illustrating a part of a data flowchart for explaining a hybrid translation method using a general-purpose neural network machine translator according to another embodiment of the present disclosure.
Figure 5:
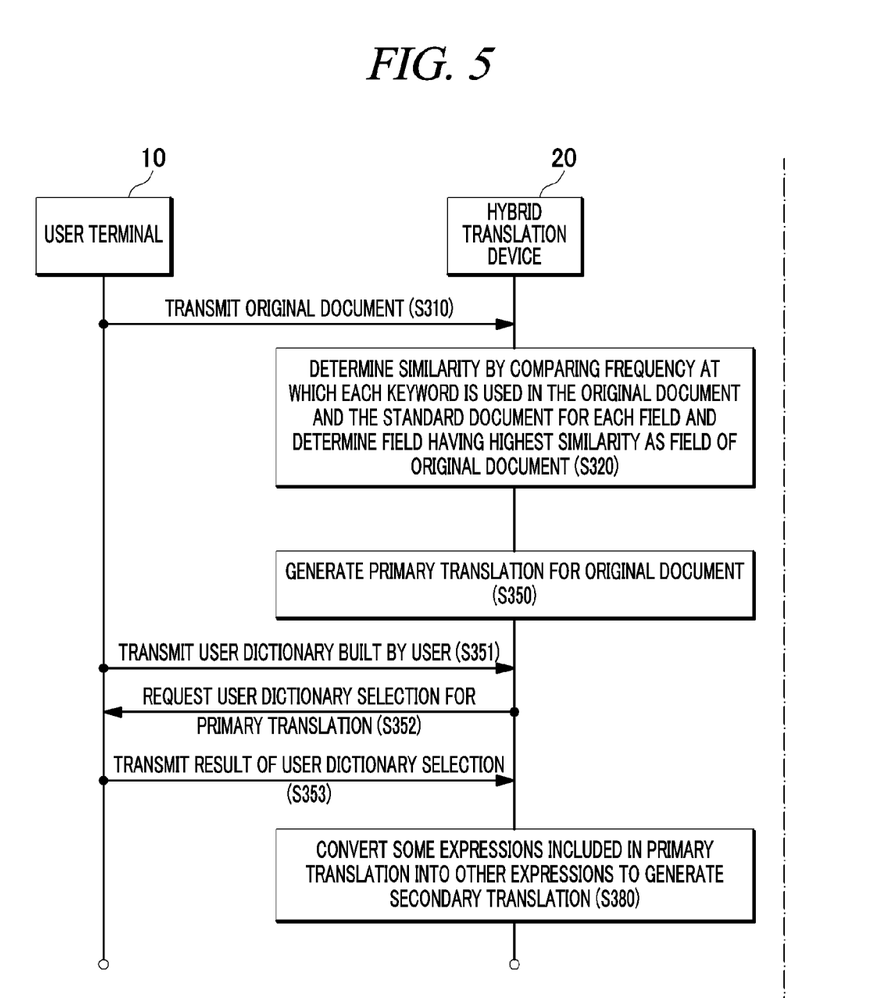
FIG. 5 is a diagram illustrating a part of a data flowchart for explaining a hybrid translation method using a general-purpose neural network machine translator according to another embodiment of the present disclosure.

FIG. 3 is a data flowchart for explaining the hybrid translation method using the general-purpose neural network machine translator according to an embodiment of the present disclosure. FIG. 4 is a diagram illustrating a part of a data flowchart for explaining a hybrid translation method using a general-purpose neural network machine translator according to another embodiment of the present disclosure. FIG. 5 is a diagram illustrating a part of a data flowchart for explaining a hybrid translation method using a general-purpose neural network machine translator according to another embodiment of the present disclosure.

Referring to FIG. 3 by way of example, the user terminal 10 may transmit an original document of a user document in the first language to the hybrid translation device 20 (S310).

Thereafter, the processor 230 may determine the field of the original document by comparing the original document with the standard document for each field stored in the database (S320).

Specifically, in step S320, the processor 230 may extract the most used keywords from the standard documents for each field stored in the database, respectively, and extract the most used keywords from the original document. In addition, the processor 230 may determine a similarity between the original document and the standard document for each field by comparing each keyword of the standard document for each field with the keywords of the original document.

More specifically, the processor 230 identifies a frequency at which each keyword is used in each standard document and the original document, and extracts keywords corresponding to the highest rank to a predetermined lower rank. In addition, the processor 230 may determine a similarity degree between the original document and the standard document for each field by determining a matching degree between the keywords of each standard document and the keywords of the original document.

That is, the processor 230 may calculate a score according to a result of determining the matching degree between the keywords of each standard document and the keywords of the original document, and determine the field of the standard document having the highest score as the field of the original document.

As an example, the processor 230 may extract top 20 keywords (for example, a noun and a verb) most frequently used in the corresponding document from the standard document for each field. Similarly, the processor 230 may extract the top 20 keywords most frequently used from the original document received from the user terminal 10. Next, the processor 230 may calculate a score of the similarity degree score by comparing the matching degree between the keywords of the original document and the keywords of each standard document. In this case, the field corresponding to the standard document having the highest score of the similarity degree may be determined as the field of the original document received from the user terminal 10.

Also referring to FIG. 3, the processor 230 may execute a preset neural network machine translator 30 among a plurality of general-purpose neural network machine translators 30 that general users may use through a preset API connection to input the original document into a translation target text input area (S330). In this case, the general-purpose neural network machine translator 30 may provide a translation configured of the second language for the input original document (S340).

Subsequently, the processor 230 may generate a primary translation configured of the second language with respect to the original document according to the translation result of the general-purpose neural network machine translator 30 (S350).

The processor 230 may request the professional translation dictionary 40 for the determined field and execute the professional translation dictionary 40 of a predetermined field among a plurality of professional translation dictionaries 40 that may be used through a preset API connection to input the primary translation configured of the second language into the translation target text input area (S360). In this case, the professional translation dictionary 40 may provide a translation of the professional translation dictionary for the primary translation (S370).

That is, the professional translation dictionary 40 stores information on a plurality of term pairs for converting a specific term of the second language to fit another term used in the professional field, and a part of speech of the term is at least one of a noun and a verb.

In addition, the processor 230 may convert some expressions included in the primary translation into an expression of another second language with reference to the translation result of the professional translation dictionary 40 to generate the secondary translation. (S380).

In one embodiment, in step S320, in a case where the keywords having a preset frequency extracted from the original document are all detected as keywords in standard documents of a plurality of fields different from each other, the processor 230 may set a plurality of fields of the original document. Accordingly, in step S380, the processor 230 may generate the secondary translation with reference to the plurality of professional translation dictionaries 40.

Specifically, in step S380, in a case where any one keyword in the primary translation is detected in the plurality of professional translation dictionaries 40, the processor 230 may compare the frequency information in which the keyword is used in the standard document of each field to determine the standard document with the highest frequency for the corresponding keyword. In addition, the processor 230 may translate the keyword with reference to the professional translation dictionary 40 of the determined standard document field.

In addition, after detecting the translation target term in the primary translation, the processor 230 may derive a term in the professional translation dictionary that may match the translation target term by reflecting user preference to generate the secondary translation.

The processor 230 may reflect the preference of the user by analyzing a relationship between the original document of the user document previously input by the user and the translation, and identifying the translation word pair preferred by the user. In addition, in the case of a new user having no history of inputting a user document, the processor 230 may regard the preference of another user who inputs a document in the same field as the preference of the new user.

For example, the processor 230 may classify the original document of the user document received from the user terminal 10 for each field and group the original document for each corresponding user account to store it in the database. Next, the processor 230 may generate a user preference dictionary matching the translation relation (translation word pair) for at least one of a word, a phrase, or a sentence based on the primary and secondary translations of the original document for each user account to store it in the database. In this case, the processor 230 may accumulate and manage a plurality of original documents received for each user account, and update the user preference dictionary whenever the primary and secondary translations thereof are generated. For example, in a case of receiving the original document of the new user document from the first user terminal 10, the processor 230 may execute translation processing of the first and secondary translations of the original document in units of words, phrases, and sentences matching the first user preference dictionary. As another example, in a case of receiving the original document from the new user terminal for the first time, the processor 230 may execute translation processing of the first and secondary translations of the original document of the new user document with reference to the first to nth user preference dictionaries corresponding to the field of the original document.

Meanwhile, the database may store the standard document for each professional field and the user preference dictionary built for each user account. In addition, in the database, the original document of the user document and translation results (primary and secondary translations) accumulated while performing a program on a method of performing hybrid translation using the general-purpose neural network machine translator may be grouped by user account to store them in the user preference dictionary.

Referring to FIG. 4 as another embodiment, in a case where a term that is not in the professional translation dictionary available to the device 20 is detected among the terms of the primary translation between the step of generating the primary translation (S350) and the step of generating the secondary translation (S380), the processor 230 may provide the detected term to the user terminal 10 in advance (S372), and receive the translation term for the detected term from the user terminal 10 (S373). At this time, if a term not found in the professional translation dictionary 40 is detected with respect to a term in the primary translation, the professional translation dictionary 40 may provide a professional translation dictionary translation except for this (S371).

That is, the processor 230 performs translation using the professional translation dictionary 40 for the remainder except for the translation term received from the user terminal 10. Thereafter, the processor 230 may generate the secondary translation by combining the translation result for the translated term received from the user terminal 10 and the translation result by the professional translation dictionary 40.

In another embodiment, referring to FIG. 5, before the step (S380) of generating the secondary translation by the processor 230, the user terminal 10 may transmit the user dictionary built by the user to the device 20 (S351). Thereafter, the processor 230 may request the user terminal 10 to select the dictionary for executing the professional field translation for the primary translation (S352). In this case, the user terminal 10 may transmit the selection result for the user dictionary to the device 20 (S353). That is, the processor 230 may generate the secondary translation based on the user dictionary (S380). For example, in the user dictionary, the user defines a translation word pair between the original document and the final translation (secondary translation) for each field. That is, the user dictionary may define a translation relationship between a translation target term (for example, a word, a phrase, or a sentence) of the first language constituting the original document and a translation target term of the second language constituting the secondary translation.

In a case of a configuration that performs the same function among the configurations illustrated in FIGS. 1 to 5 described above, the description will be omitted.

Figure 6:
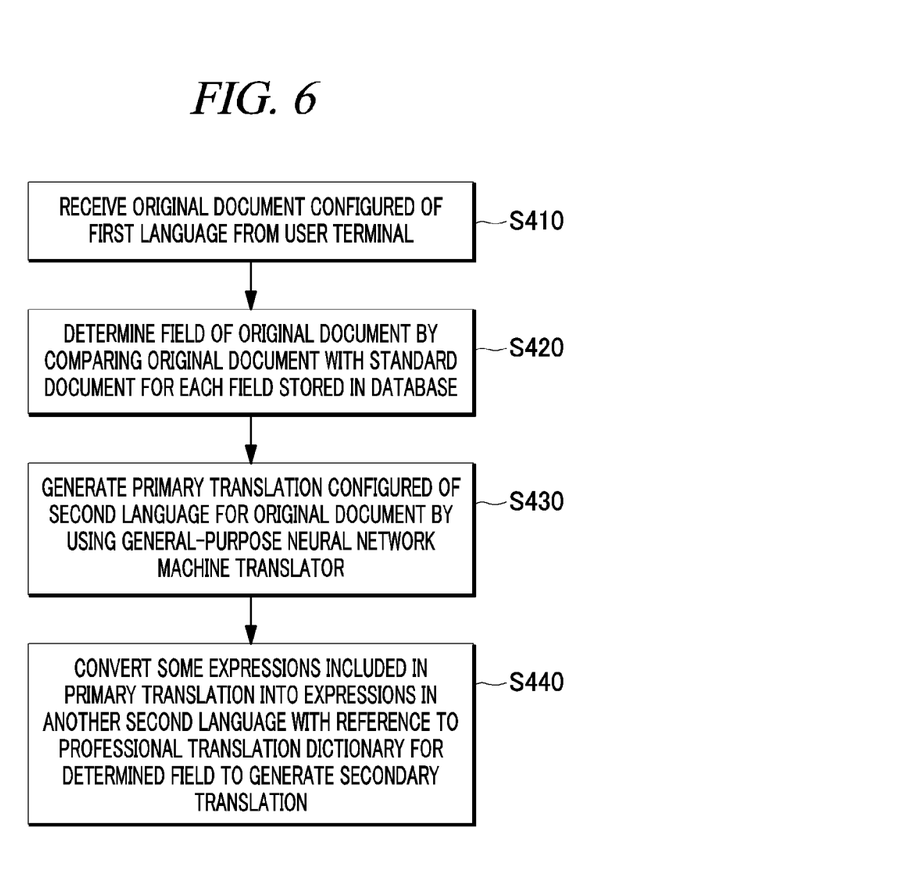
FIG. 6 is a flowchart for explaining a hybrid translation method using a general-purpose neural network machine translator according to an embodiment of the present disclosure.

FIG. 6 is a flowchart for explaining a hybrid translation method using a general-purpose neural network machine translator according to an embodiment of the present disclosure.

Referring to FIG. 6, the method of performing hybrid translation using the general-purpose neural network machine translator according to an embodiment of the present disclosure includes a step of receiving an original document configured of a first language from the user terminal 10 (S410), a step of determining the field of the original document by comparing the original document with the standard document for each field stored in the database (S420), a step of generating a primary translation configured of a second language for the original document by using the general-purpose neural network machine translator 30 (S430), and a step of converting some expressions included in the primary translation into expressions in another second language with reference to the professional translation dictionary 40 for the determined field to generate a secondary translation (S440). The expression includes any one of a word, a phrase, and a sentence, and the general-purpose neural network machine translator is a commercial neural network machine translator of another company that is open for use by general users online.

The step of determining the field of the original document (S420) may include a step of extracting each of the most used keywords from the standard document for each field stored in the database, extracting the most used keywords from the original document, and comparing respective keywords with each other to determine the similarity degree between the original document and the standard document for each field.

In the step of determining the similarity degree, the frequency at which respective keywords are used are identified in each standard document and the original document, keywords corresponding from the highest frequency to a predetermined lower rank are extracted, and the matching degree between keywords of each standard document and keywords in the original document is determined to determine the similarity between the original document and the standard document for each field.

In the step of determining the field of the original document (S420), the field of the standard document having the highest score according to the result of determining the matching degree between the keywords of each standard document and the keywords of the original document may be determined as the field of the original document.

The professional translation dictionary 40 stores information on a plurality of term pairs for converting a specific term of the second language to fit another term used in the professional field, and the part of speech of the term is about at least one the noun and the verb.

In the step of generating the primary translation (S430), a preset neural network machine translator 30 among a plurality of general-purpose neural network machine translators 30 that general users may use through a preset API connection may be executed and the original document may be input into the translation target text input area to generate the primary translation.

Before the step of generating the secondary translation (S440), a step of receiving the user dictionary built by the user from the user terminal 10, a step of requesting a dictionary selection to perform professional field translation for the primary translation with the user terminal 10, a step of receiving a selection for the user dictionary from the user terminal 10, and a step of generating the secondary translation based on the user dictionary may be further provided.

In the step of determining the field of the original document (S420), in a case where keywords having a preset frequency extracted from the original document are all detected as keywords in standard documents of a plurality of fields different from each other, a plurality of fields of the original document are set, and the step of generating the secondary translation may include a step of generating the secondary translation with reference to the plurality of professional translation dictionaries 40.

In the step of generating the secondary translation (S440), in a case where any one keyword in the primary translation is detected in all the plurality of professional translation dictionaries 40, information on the frequency of using the keyword in the standard document of each field is compared and the translation of the keyword may be performed by referring to the professional translation dictionary 40 in a field of standard document which is used more frequently.

In the step of generating the secondary translation (S440), after detecting the translation target term of the primary translation, the preference of the user is reflected, and a term in the professional translation dictionary suitable to match the translation target term may be derived to generate the secondary translation.

In the step of generating the secondary translation (S440), the translation word pair preferred by the user is identified by analyzing a relationship between the original document and the translation of the user document previously input by the user to reflect the preference of the user, and in a case of a new user who has no history of inputting the user document, the preference of other users who input documents in the same field may be regarded as the preference of the new user.

Between the step of generating the primary translation (S430) and the step of generating the secondary translation (S440), in a case where a term which is not in the professional translation dictionary 40 available by the device 20 is detected among the terms of the primary translation, the method may further include a step of providing the detected term to the user terminal 10 in advance and receiving a translation term for the detected term from the user terminal 10.

In the step of generating the secondary translation (S440), except for the translation term received from the user terminal 10, after performing the translation using the professional translation dictionary 40 for the rest, the translation result for the translation term received from the user terminal 10 and the translation result by the professional translation dictionary 40 may combine to generate the secondary translation.

The method of performing hybrid translation using a general-purpose neural network machine translator according to an embodiment of the present disclosure may also be implemented in a form of a recording medium including instructions executable by a computer, such as a program module executed by a computer. Computer-readable media may be any available media that may be accessed by a computer and includes all volatile and nonvolatile media, removable and non-removable media. Also, computer-readable media may include all computer storage media and communication media. Computer storage media includes all volatile and nonvolatile, removable and non-removable media implemented in any method or technology for storage of information such as computer readable instructions, data structures, program modules or other data. Communication media typically includes computer readable instructions, data structures, program modules, or other data in a modulated data signal such as a carrier wave, or other transport mechanism, and includes any information delivery media.

Although the method and system of the present disclosure are described with reference to specific embodiments, some or all of their components or operations may be implemented using a computer system having a general-purpose hardware architecture.

The above description of the present disclosure is for illustration, and it will be will understood that those of ordinary skill in the art to which the present disclosure pertains may easily transform into other specific forms without changing the technical spirit or essential features of the present disclosure. Therefore, it should be understood that the embodiments described above are illustrative in all respects and not restrictive. For example, each component described as a single form may be implemented in a distributed form, and likewise components described as distributed form may be implemented in a combined form.

The scope of the present disclosure is indicated by the following claims rather than the detailed description, and it should be interpreted that all changes or modifications derived from the meaning and scope of the claims and their equivalents are included in the scope of the present disclosure.

What is claimed is:

1. A method of performing hybrid translation using a general-purpose neural network machine translator by a device, comprising:
   (a) receiving an original document configured of a first language from a user terminal;
   (b) determining a field of the original document by comparing the original document with a standard document for each field stored in a database;
   (c) generating a primary translation configured of a second language for the original document by using the general-purpose neural network machine translator; and
   (d) converting some expressions included in the primary translation into expressions in another second language with reference to a professional translation dictionary for the determined field to generate a secondary translation,
   wherein the expression includes any one of a word, a phrase, and a sentence,
   wherein the general-purpose neural network machine translator is a commercial neural network machine translator of any company that is open for use by general users online,
   wherein, in the step of generating the secondary translation, after detecting a translation target term of the primary translation, a preference of the user is reflected, and a term in the professional translation dictionary suitable to match the translation target term is derived to generate the secondary translation, and
   wherein, in the step of generating the secondary translation, the translation word pair preferred by the user is identified by analyzing a relationship between the original document and the translation of a user document previously input by the user to reflect the preference of the user, and in a case of a new user who has no history of inputting the user document, the preference of other users who input documents in the same field is regarded as the preference of the new user.

2. The method of performing hybrid translation using a general-purpose neural network machine translator of claim 1, wherein
   the step of determining the field of the original document includes extracting each of the most used keywords from the standard document for each field stored in the database, extracting the most used keywords from the original document, and comparing respective keywords with each other to determine a similarity degree between the original document and the standard document for each field.

3. The method of performing hybrid translation using a general-purpose neural network machine translator of claim 2, wherein
   in the step of determining the similarity degree, a frequency at which respective keywords are used are identified in each standard document and the original document, keywords corresponding from the highest frequency to a predetermined lower rank are extracted, and a matching degree between keywords of each standard document and keywords in the original document is determined to determine the similarity between the original document and the standard document for each field.

4. The method of performing hybrid translation using a general-purpose neural network machine translator of claim 3, wherein
   in the step of determining the field of the original document, a field of the standard document having the highest score according to the result of determining the matching degree between the keywords of each standard document and the keywords of the original document is determined as the field of the original document.

5. The method of performing hybrid translation using a general-purpose neural network machine translator of claim 1, wherein
   the professional translation dictionary stores information on a plurality of term pairs for converting a specific term of the second language to fit another term used in the professional field, and a part of speech of the term is about at least one a noun and a verb.

6. The method of performing hybrid translation using a general-purpose neural network machine translator of claim 1, wherein
in the step of generating the primary translation, a preset neural network machine translator among a plurality of the general-purpose neural network machine translators that general users are configured to use through a preset API connection is executed, and the original document is input into the translation target text input area to generate the primary translation.

7. The method of performing hybrid translation using a general-purpose neural network machine translator of claim 1, wherein
before the step of generating the secondary translation, the method further comprising:
receiving a user dictionary built by a user from the user terminal;
requesting a dictionary selection to perform professional field translation for the primary translation with the user terminal;
receiving a selection for the user dictionary from the user terminal; and
generating the secondary translation based on the user dictionary.

8. The method of performing hybrid translation using a general-purpose neural network machine translator of claim 1, wherein
in the step of determining the field of the original document, when keywords having a preset frequency extracted from the original document are all detected as keywords in standard documents of a plurality of fields different from each other, a plurality of fields of the original document are set, and
the step of generating the secondary translation includes generating the secondary translation with reference to the plurality of professional translation dictionaries.

9. The method of performing hybrid translation using a general-purpose neural network machine translator of claim 8, wherein
in the step of generating the secondary translation, when any one keyword in the primary translation is detected in all the plurality of professional translation dictionaries, information on the frequency of using the keyword in the standard document of each field is compared and the translation of the keyword is performed by referring to the professional translation dictionary in a field of the standard document which is used more frequently.

10. The method of performing hybrid translation using a general-purpose neural network machine translator of claim 1, wherein
between the step of generating the primary translation and the step of generating the secondary translation, when a term which is not in the professional translation dictionary available by the device is detected among the terms of the primary translation, the method further comprising:

providing the detected term to the user terminal in advance and receiving a translation term for the detected term from the user terminal.

11. The method of performing hybrid translation using a general-purpose neural network machine translator of claim 10, wherein
in the step of generating the secondary translation, except for the translation term received from the user terminal, after performing the translation using the professional translation dictionary for the rest, a translation result for the translation term received from the user terminal and a translation result by the professional translation dictionary combine to generate the secondary translation.

12. A hybrid translation device using a general-purpose neural network machine translator, comprising:
a memory storing a program for a method of performing hybrid translation using a general-purpose neural network machine translator; and
a processor executing the program;
wherein according to the execution of the program, the processor
receives an original document configured of a first language from a user terminal;
determines a field of the original document by comparing the original document with a standard document for each field stored in a database;
generates a primary translation configured of a second language for the original document by using the general-purpose neural network machine translator; and
converts some expressions included in the primary translation into expressions in another second language with reference to a professional translation dictionary for the determined field to generate a secondary translation,
wherein the expression includes any one of a word, a phrase, and a sentence,
wherein the general-purpose neural network machine translator is a commercial neural network machine translator of any company that is open for use by general users online,
wherein, in the step of generating the secondary translation, after detecting a translation target term of the primary translation, a preference of the user is reflected, and a term in the professional translation dictionary suitable to match the translation target term is derived to generate the secondary translation, and
wherein, in the step of generating the secondary translation, the translation word pair preferred by the user is identified by analyzing a relationship between the original document and the translation of a user document previously input by the user to reflect the preference of the user, and in a case of a new user who has no history of inputting the user document, the preference of other users who input documents in the same field is regarded as the preference of the new user.

* * * * *